United States Patent [19]

Bosshard

[11] 4,356,062
[45] Oct. 26, 1982

[54] RACK FOR STORING BUNDLES OF NUCLEAR FUEL ELEMENTS

[75] Inventor: Ernst Bosshard, Winterthur, Switzerland

[73] Assignee: Sulzer Brothers Limited, Winterthur, Switzerland

[21] Appl. No.: 139,343

[22] Filed: Apr. 11, 1980

[30] Foreign Application Priority Data

Apr. 23, 1979 [CH] Switzerland .......................... 3807/79
May 31, 1979 [CH] Switzerland .......................... 5087/79

[51] Int. Cl.³ ............................................. G21C 19/20
[52] U.S. Cl. .................................. 376/272; 250/507.1
[58] Field of Search ............................... 176/30, 76, 78; 250/506, 507

[56] References Cited

U.S. PATENT DOCUMENTS

| | | | |
|---|---|---|---|
| 3,965,359 | 6/1976 | Bosshard | 250/507 |
| 4,029,968 | 6/1977 | Rubinstein | 250/507 |
| 4,042,828 | 8/1977 | Rubinstein | 176/87 |
| 4,139,778 | 2/1979 | Raymond | 250/507 |
| 4,165,255 | 8/1979 | Knight | 176/30 |
| 4,208,249 | 6/1980 | Jabsen | 176/78 |
| 4,265,010 | 5/1981 | Doss | 176/30 |

*Primary Examiner*—Donald P. Walsh
*Attorney, Agent, or Firm*—Kenyon & Kenyon

[57] ABSTRACT

The rack has a base plate which is formed with a pattern of holes and tube sections which are located under the holes. Feet are threaded into the tube sections and can be adjusted through the tube sections and plate so as to level the base plate. Hollow bolts can also be threaded into the upper portions of the hollow tubes in order to clamp square support tubes to the base plate. Suitable adjustment means are also provided to adjust each foot.

21 Claims, 7 Drawing Figures

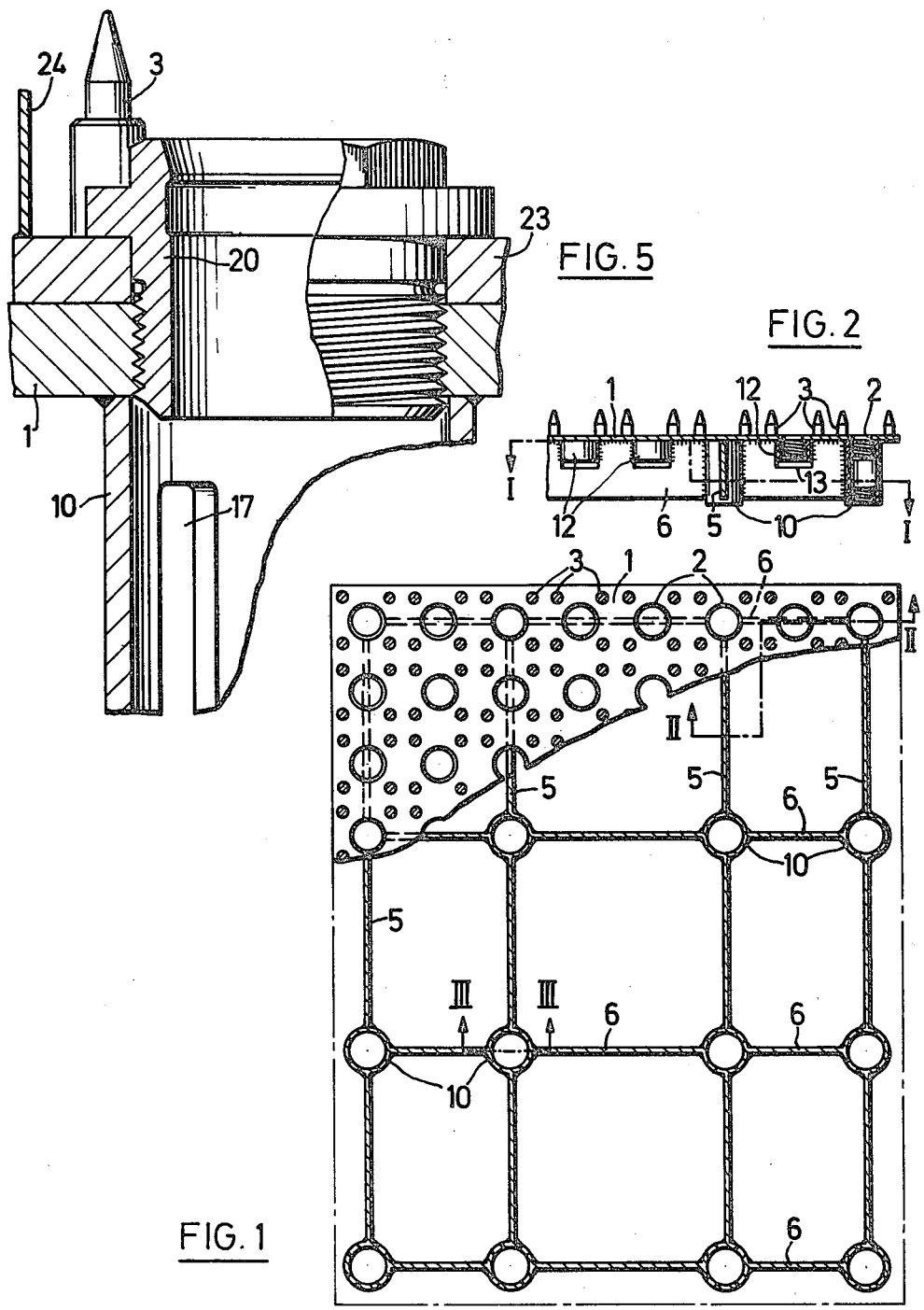

RACK FOR STORING BUNDLES OF NUCLEAR FUEL ELEMENTS

This invention relates to a rack for storing bundles of nuclear fuel elements in a water tank.

Heretofore, it has been known to use racks for storing bundles of nuclear fuel elements in water tanks. Generally, these racks are composed of a base plate which may be reinforced by ribs and a plurality of prismatic support tubes which are releasably secured coaxially of holes in the base plate. In one known instance, for example, as described in Swiss Patent Application No. 6310/78, the support tubes are initially bolted onto the base plate and the assembled unit is then placed in a water tank, levelled and then connected to adjacent racks where applicable. However, it has been found that existing crane capacities are frequently only sufficient for racks having a relatively small base area. Thus, there is a limit to the size of racks which can be installed in a water tank. Further, these racks require special precuations in order to prevent tipping in the event of an earthquake.

Accordingly, it is an object of the invention to provide a rack of relatively wide base area for storing bundles of nuclear fuel elements in a water tank.

It is another object of the invention to preclude the tipping of racks used to store bundles of nuclear fuel elements in water tanks.

It is another object of the invention to provide a rack which can be readily assembled in a water tank.

It is another object of the invention to provide a base plate for a rack which can be readily installed by crane equipment and subsequently combined with other rack forming components.

Briefly, the invention provides a rack for storing bundles of nuclear fuel elements in a water tank which is comprised of a base plate, a plurality of tube sections and a plurality of feet. The base plate is formed with a predetermined pattern of holes while the tube sections are disposed on an underside of the base plate coaxially with the respective holes, for example at least each of the four farthest apart holes of the pattern of holes. Each tube section also has a screw-thread at the end remote from the base plate while each foot is threaded into the screw thread for longitudinal adjustment therein through a respective hole.

The rack also has a plurality of prismatic support tubes which are mounted on the upper side of the base plate. Each of these support tubes is disposed over one of the holes in alignment with a respective tube section and has an inwardly directed base flange. In addition, a means is provided which passes through a respective hole in the base plate for clamping each base flange of a support tube to the base plate.

The construction of the rack permits the base plate to be readily manufactured of a suitable size to be placed on the bottom of a water tank and levelled from above, i.e., through the plate, before any support tubes are fixed to the plate.

The rack may also have reinforcing ribs on the base plate in alignment with the pattern of holes while the tube sections are welded to the base plate. These features provide additional reinforcement for the base plate, particularly if the base plate ribs are also welded to the tube sections.

Each tube section of the rack is also provided with a plurality of lateral holes so as to ensure water circulation in the bundles of fuel elements mounted on the rack.

In order to facilitate assembly of the support tubes on the base plate, each tube section is provided with a second screw-thread at an end adjacent the base plate and the means for clamping a support tube in place is in the form of a hollow bolt which is threaded into the screw thread through the base plate. The bolt also has a radial flange for clamping a flange of a prismatic support tube to the base plate. In this embodiment, the base plate does not require screw threads to be cut in the holes. Further, a hollow screw can be threaded into the screw thread at the remote end of a tube section in order to abut a top end face of a foot therein. This provides a simple means of securing the foot against turning. The provision of an internal screw-thread to receive the foot also enables the tube section to be welded to adjoining ribs over practically the entire length thereof.

Each respective foot and an abutting screw may also have engagement surfaces to permit simultaneously turning or retaining from above. This enables the locking screw to be tightened without rotation of the foot.

Each foot may also be provided with a central bore for passage of a depth gauge therethrough and a top abutment surface defining a measuring datum for the depth gauge. These features permits a check to be made as to whether the feet are in contact with the bottom of the tank. Further, each foot may be provided with a base which is loosely connected to the foot and which has a central passage for the depth gauge. Also, each foot and base are provided with mating spherical surfaces so as to form a joint in the form of a ball and socket. This joint provides contact with the bottom of the tank over a considerable area so that local point pressures are avoided.

In another embodiment, each hole of the base plate is provided with at least two longitudinal grooves while the clamping means includes a sleeve having bayonet lugs on one end for passing through the grooves to abut the underside of the base plate. In addition, the sleeve is provided with a screw thread at an opposite end to receive a screw-threaded member which is disposed in abutting relation with the base flange. In this embodiment, there is no need to cut screw threads for the support tube in the base plate or in the top end of the tube sections. Further, when the screw-threaded member is tightened, a reduced torque is exerted on the base plate so that the screw threaded member can hardly be turned or slip as a result.

The screw thread on the sleeve can be an external screw-thread while the screw-threaded member is in the form of a nut. This provides an additional advantage inasmuch as the passage cross-section of the clamping means consisting of the sleeve and nut can be made larger than if the sleeve had an internal screw thread engaging with an external screw-thread of a drilled headed bolt.

The longitudinal grooves and lugs in the base plate and sleeve are distributed uniformly about the periphery of the hole and sleeve, respectively, at a given pitch. In addition, the sleeve is provided with a plurality of tool-engagement surfaces which are disposed at the same pitch for rotation of the sleeve. Thus, no special attention is required with respect to the position of the sleeve relative to the tool when the tool is used to hold the sleeve for assembling of the rack.

The screw-threaded member of this clamping means may also have tool-engagement surfaces for rotation of the member as well as an outer periphery for centering a bundle of nuclear fuel elements thereon. This provides a relatively simple, inexpensive and light weight construction.

These and other objects and advantages of the invention will become more apparent from the following detailed description and appended claims taken in conjunction with the accompanying drawings in which:

FIG. 1 illustrates a plan view and horizontal section of a base plate according to the invention taken on line I—I of FIG. 2;

FIG. 2 illustrates a view taken on line II—II of FIG. 1;

FIG. 5 illustrates a modified base plate in accordance with the invention;

Figure 3:
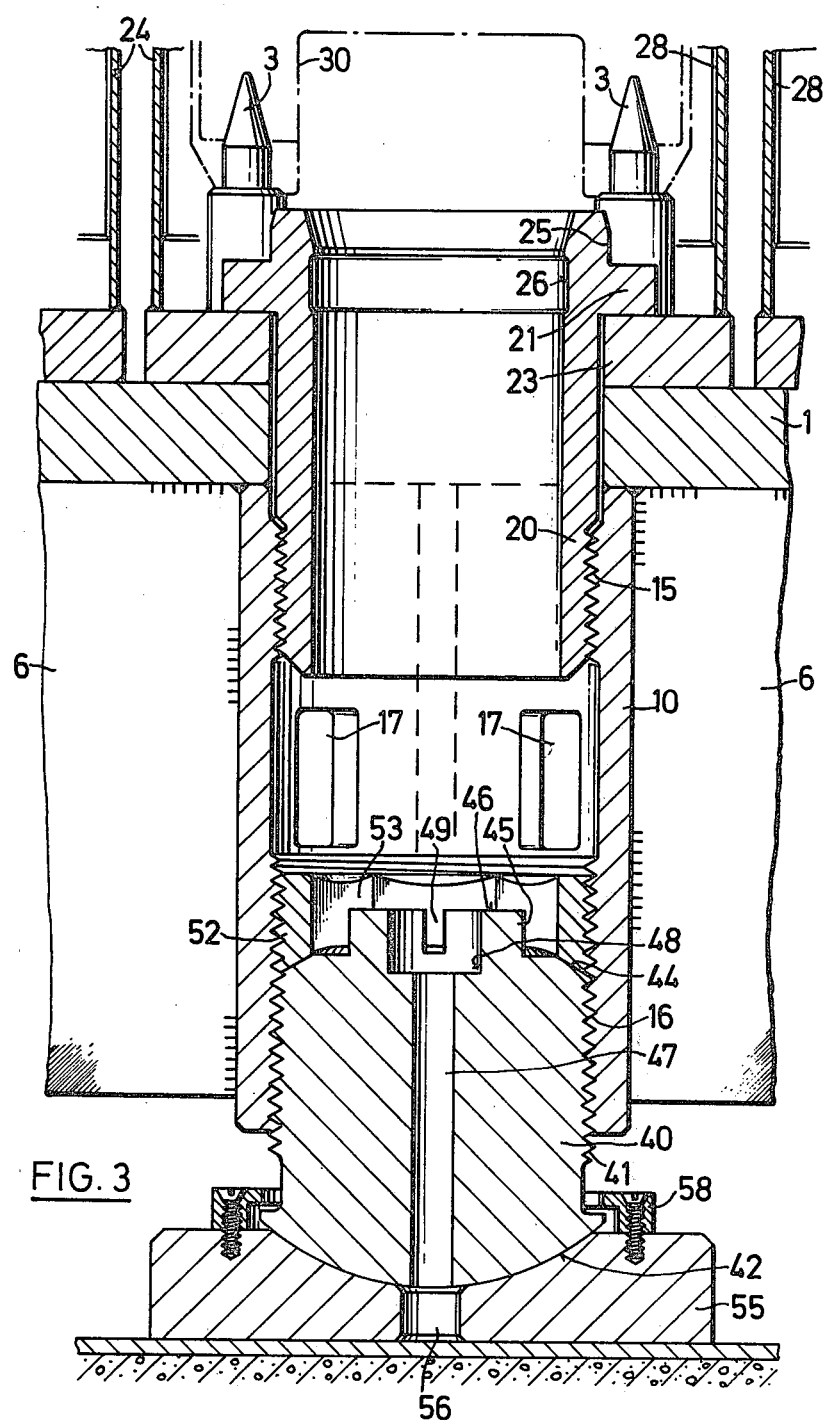
FIG. 3 illustrates a vertical sectional view taken on line III—III of FIG. 1 of an assembled support tube and plate in accordance with the invention.

Referring to FIGS. 1 and 2, the rack for storing bundles of nuclear fuel elements in a water tank includes a base plate 1 having a predetermined pattern of holes 2 therein and a pattern of locating pins 3 on an upperside thereof. As indicated, the holes 2 are arranged in an 8 by 10 pattern to provide 80 holes. The locating pins are disposed four to a hole so as to provide 320 pins 3. Four longitudinal ribs 5 and four transverse ribs 6 are welded to the underside of the base plate 1 in alignment with certain holes 2 as indicated. In addition, a plurality of tube sections 10 are welded on the underside of the base plate 1 to the sixteen points of intersection of the ribs 5, 6 and are disposed coaxially with corresponding holes 2. As indicated, the ribs 5, 6 terminate at each tubular section 10 and are welded to each section 10. A plurality or short tubular members 12 are welded on the underside of the plate 1 coaxially of the remaining holes 2. The ribs 5, 6 have cut-outs 13 at the places where the ribs 5, 6 register with the short tubular members 12. Also, the tubular members 12 are welded to the ribs 5, 6.

As indicated in FIG. 1, the tube sections 10 are located at each of the four farthest apart holes 2 as well as at the intersections of the ribs 5, 6.

Referring to FIG. 3, each tube section 10 has a screwthread 15 at the end adjacent the base plate 1 and a screw-thread 16 at the end remote from the base plate 1. In addition, a plurality of lateral holes in the form of window-like cutouts 17 are disposed between the two screw threads 15, 16. A clamping means such as a hollow bolt 20 is threaded into the screw-thread 15 and has a radial flange 21 extending therefrom over the upper side of the base plate 1 for clamping a flange 23 of a prismatic, e.g., square support tube 24 to the base plate 1. The hollow bolt 20 also has a short hexagonal head 25 and an annular groove 26 concentric of the flange 21. A long hexagonal spanner can be fitted over the hexagonal head 25 to engage in the groove 26 by suitable holding means (not shown). The hollow bolt 20 can thus be readily introduced through the top of the support tube 24 into the opening of the flange 23 and into the screw thread 15. Thereafter, the bolt 20 can tightened in place.

An empty support tube 24 can also be released from the base plate 1 by means of the spanner and can be removed from the water filled tank.

Each support tube 24 is laterally centered by the four locating pins 3 associated with each hole 2. Each support tube 24 serves to receive bundles of nuclear fuel elements, the bottom outline of which is shown, for example by dot-dash lines 30. A lining plate 28 is also welded inside the support tube 24 and sheets (not shown) of a neutron-absorbent material, for example Boral, are disposed between the tube 24 and the lining 28.

Each tube section 10 also has a foot 40 with an external screw thread 41 threaded into the screw thread 16. Each foot 40 has a part-spherical surface 42 at the bottom, a top conical end face 44, a shoulder 45, a top abutment surface 46, a recess 48 and a screw slot 49. In addition, a hollow screw 52 with an internal hexagonal surface 53 is threaded into the screw thread 16 to abut the top end face 44 of the foot 40. In addition, a base 55 is loosely connected to the foot 40 via a retaining ring 58 which is secured by screws to the top surface of the base 55. The ring 58 has an inside diameter which is less than the maximum outside diameter of a part spherical surface 42 on the lower end of the foot 40. As indicated, the spherical surface 42 of the foot 40 is received in a mating spherical surface of the base 55 while the bottom of the base 55 is flat.

As shown in FIG. 3, the foot 40 has a central bore 47 while the base 55 has a central passage 56 for purposes as explained below.

Figure 4:
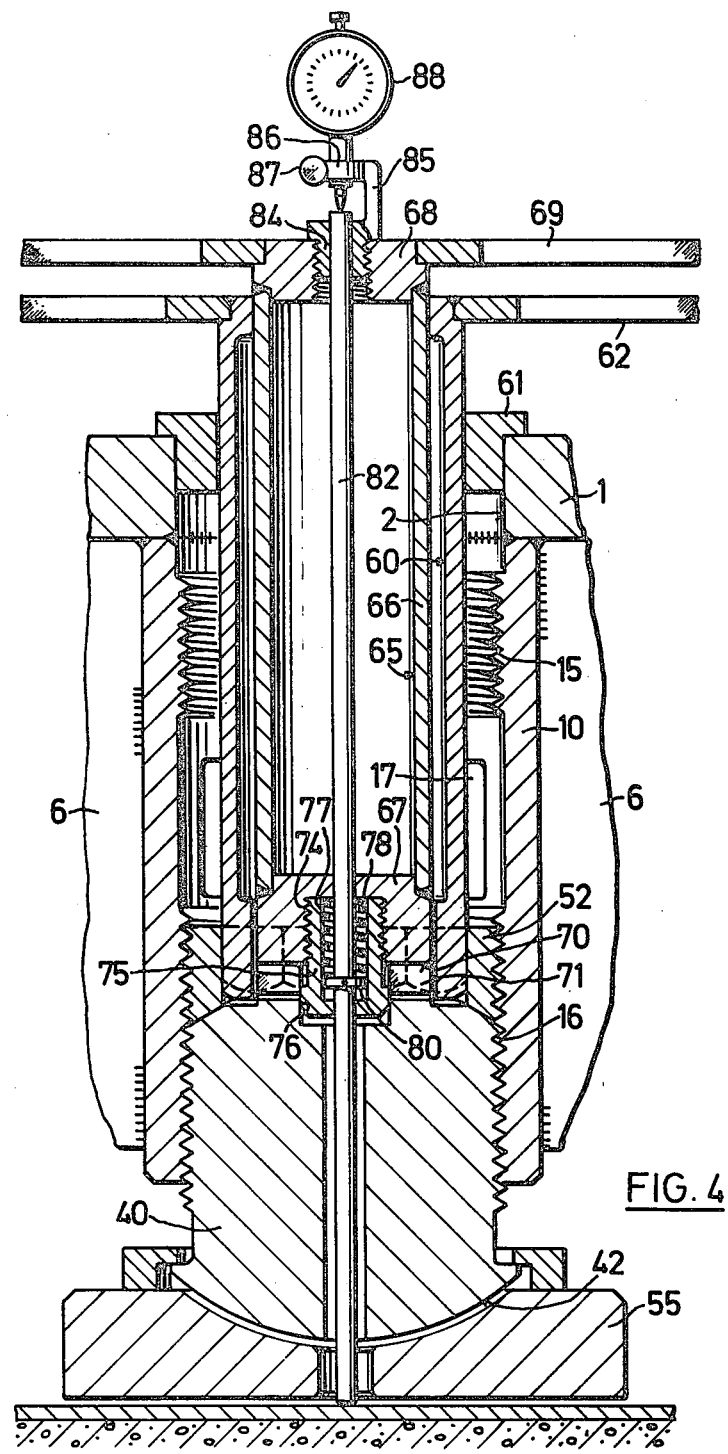
FIG. 4 illustrates a vertical sectional view of a base plate in accordance with the invention during a levelling operation.

Referring to FIG. 4, in order to carry out an adjustment of a foot 40 a suitable tool is used. To this end, the tool employs a hexagonal key 60 which fits into the internal hexagonal engagement surface 53 of the hollow screw 52 and a centering ring 61 which fits into the hole 2 of the base plate 1 for centering of the key 60. The key 60 carries a two-armed lever 62 for turning of the key 60. In addition, the tool employs a rotary key 65 which is comprised of a tube 66, a head 67, a guide member 68 and a handle 69 which fits into an axial bore-hole of the hexagonal key 60. The head 67 has a flat end face 70 from which two flat lugs 71 project into the screw slot 49 of the foot 40 (which foot is shown in a position turned 90° with respect to the position shown in FIG. 3). In addition, the head 67 has an internal screw thread 74 in a tap hole in which a screw 75 in the form of a cap is threaded. The screw 75 has a collar 76 received within the recess 48 of the foot 40 as well as a cylindrical chamber 77 which contains a spring 78. One end of the spring 78 bears against the tap hole 74 in the head 67 while the other end bears against an adjusting ring 80 fixed on a probe 82 of a depth gauge. As indicated, the probe 82 passes through the bore 47 of the foot 40 and the passage 56 of the base 55. The probe 82 also passes through the cap screw 75, the head 67 and, at the upper end, through a bore in a screw threaded base portion 84 of a base holder 85. The base portion 84 of the guage holder 85 is threaded into the guide member 68 of the rotary key 65 while a gauge 88 is attached to a top part 86 of the gauge holder 85 via a clamp screw 87.

In order to assemble a rack, the base plate 1 is provided with the tube sections 10, the feet 40 and the respective bases 55. The base plate 1 is then lowered into the required location within a water tank while the tank is still empty. The plate 1 is then levelled by adjustment of three of the farthest apart feet, for example by means of the tool shown in FIG. 4, until the base plate is levelled, as determined by a spirit level. The locking screw 52 is then tightened by actuation of the lever 62 while the handle retains the foot 40 in place, i.e., against rotation. In order to avoid any problem when adjusting the fourth foot because it may be difficult to trace the point where the foot just touches the ground during vertical adjustment, use is made of the measuring system shown in FIG. 4. For this purpose, the manufacturing tolerances obtained for the height of the top abutment surface 46 above the bottom end face of the base 55 when the foot 40 and base 55 are in contact are made very close. Since the end face 70 of the head 67 rests on the top abutment surface 46 during assembly, the surface 46 provides a suitable measuring datum for the depth gauge. Thus, the gauge 88 which has been previously set to zero by means of a template (not shown) indicates the clearance still present between the foot 40 and the base of the tank. The point of the gauge 88 then moves towards the ZERO position as the foot 40 is screwed down by means of the handle 69. When the pointer reaches zero, the clearance between the foot and the bottom of the tank is also zero. The locking screw 52 can then be tightened by means of the lever 62.

Referring to FIG. 5, the clamping means, i.e., bolt 20, for clamping a base flange 23 of a support tube 24 to the base plate 1 may be modified so as to be threaded directly into the base plate 1. Depending upon the equipment available at the workshop, the screw thread for the bolt 20 may be cut in the base plate itself instead of in the tube section 10. An advantage of this is that the short tubular members 12 can be eliminated along with the labor for welding the ribs 5, 6 to the tubular members 12.

Figure 6:
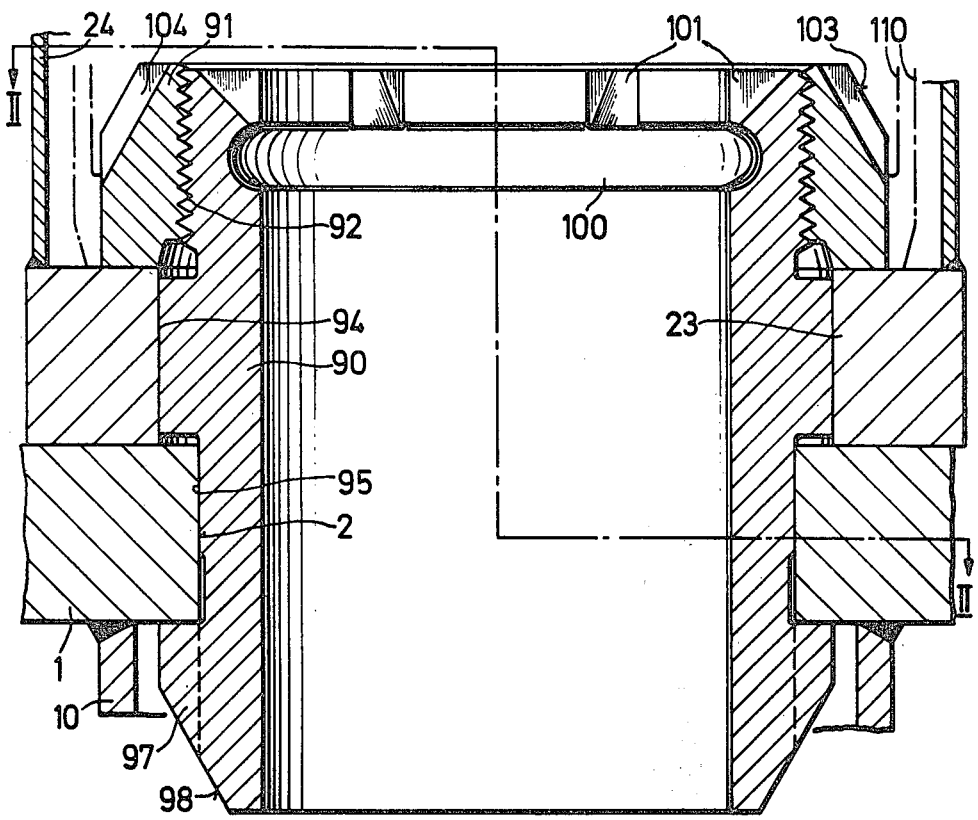
FIG. 6 illustrates a vertical sectional view of a rack having a modified clamping means in accordance with the invention.
Figure 7:
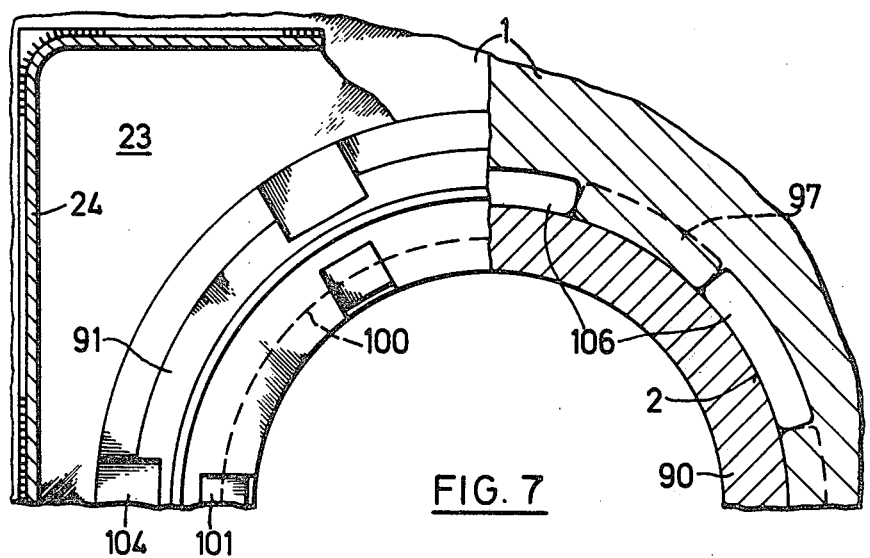
FIG. 7 illustrates a view taken on line II—II of FIG. 6.

Referring to FIG. 6, wherein like reference characters indicate like parts as above, the hollow clamping means may also be clamped to the base plate 1. In this embodiment, the clamping means is composed of a sleeve 90 and a screw threaded member 91 in the form of a nut. As illustrated, the sleeve 90 has an external screw thread 92 at the top, a cylindrical collar 94 for fitting within a flangee 23 of a support tube 24, a cylindrical locating surface 95 for fitting within a hole 2 of the base plate 1 and six bayonet lugs 97 distributed uniformly over the periphery of the sleeve 90 and terminating in a conical surface 98. A semi-circular corss-sectional annular groove 100 is also provided in the zone of the external screw thread 92 on the inside of the sleeve 90. The sleeve 90 also has six uniformly distributed inwardly inclined slots 101 which extend from the top end face of the sleeve to form tool-engagement surfaces for a rotating tool (not shown).

The nut 91 is of circular cylindrical shape on the outside and is bevelled at the top by a conical surface 103. In addition, the nut has six slots 104 extending parallel to the conical surface 103 cut into the zone of the bevel to form tool-engagement surfaces for a second rotating tool (not shown). The outer periphery of the nut 91 also serves to center a bundle of nuclear fuel elements therein as indicated by the dash-dotted lines 110.

The hole 2 in the base plate 1 has six longitudinal grooves 106 therein. These grooves 106 are of a width and depth adapted to the width and height of the lugs 97 of the sleeve 90 so that the lugs 97 can readily pass through the grooves 106. To this end, the grooves 106, the lugs 97 and the tool-engagement surfaces 101 are at the same given pitch. In addition, the locating surface 95 of the sleeve 90 fits into the hole 2 with a small clearance.

In order to mount a support tube 24 on the base plate 1, a mandrel (not shown) having diameters to match the diameter of the hole 2 and the inside diameter of the flange 23, and slightly pointed at the front, is introduced into the flange 23 of the support tube 24 from above. As the support tube 24 is lowered, the mandrel brings the tube 24 into the correct position with respect to the hole 2. While the mandrel remains in the hole 2, the support tube 24 is rotated about its vertical axis into the correct angular position with respect to the base plate 1. The mandrel is then removed in an upward direction. A two-part manipulating tool is then used to engage the sleeve 90 and the nut 91. A first part of the tool moves into the bore of the sleeve 90 and engages in at least two of the six slots 101 as well as in the annular groove 100. Engagement in the annular groove 100 secures the sleeve 90 against axial slip. The second part of the manipulating tool engages in at least two of the six slots 104 of the nut 91. The manipulating tool is then used to rotate the sleeve 90 and the nut 91 appropriately and to introduce the sleeve 90 and nut 91 into the bore of the base flange 23 and the hole 2 in the base plate 1. During this time, the lugs 97 of the sleeve 90 pass through the grooves 106 in the base plate 1. The two parts of the manipulating tool are then turned 30° so that the lugs 97 of the sleeve 90 assume a position beneath the base plate projections between the grooves 106. The second part of the manipulating tool is then turned while the first part is secured so that the nut 91 is screwed down on the sleeve 90 to abut against the flange 23. The flange 23 is thus clamped onto the base plate 1. When the correct torque has been applied, the retaining means of the first part of the manipulating tool engaging in the annular groove 100 of the sleeve 90 is withdrawn and the two parts of the manipulating tool are removed in the upward direction. The support tube 24 is then ready to receive a bundle of fuel elements, the base portion of which is centered on the nut 91 as indicated by the dot-dash lines 110.

What is claimed is:

1. A rack for storing bundles of nuclear fuel elements in a water tank, said rack comprising
   a base plate having a predetermined pattern of holes therein;
   a plurality of tube sections on an underside of said base plate, each said tube section being disposed coaxially with one of at least the four farthest apart holes of said pattern of holes, each said tube section having a first screw-thread at an end remote from said base plate; and
   a plurality of feet, each said foot being threaded into a screw-thread of a respective tube section for longitudinal adjustment therein through a respective hole.

2. A rack as set forth in claim 1 which further comprises reinforcing ribs on said plate in alignment with said pattern of holes.

3. A rack as set forth in claim 1 wherein said tube sections are welded to said base plate.

4. A rack as set forth in claim 3 wherein each tube section has a plurality of lateral holes therein.

5. A rack as set forth in claim 1 wherein each tube section has a second screw-thread at an end adjacent said base plate and which further comprises a hollow bolt threaded into said second screw-thread and having a radial flange for clamping a flange of a prismatic support tube to said base plate, and a hollow screw threaded into said first-screw thread to abut a top end face of a respective foot therein.

6. A rack as set forth in claim 5 wherein each of a respective foot and an abutting screw have engagement surfaces to permit simultaneous turning thereof.

7. A rack as set forth in claim 1 wherein each foot has a central bore for passage of a depth gauge therethrough and a top abutment surface defining a measuring datum for the depth gauge.

8. A rack as set forth in claim 7 which further comprises a plurality of bases, each said base being loosely connected to a respective foot and having a central passage for the depth gauge, each foot having a spherical surface received in mating relation on a respective base.

9. A rack comprising,
a base plate having a predetermined pattern of holes therein;
a plurality of tube sections on an underside of said base plate, each said tube section being disposed coaxially with one of at least the four farthest apart holes of said pattern of holes, each said tube section having a first screw-thread at an end remote from said base plate;
a plurality of feet, each said foot being threaded into a screw-thread of a respective tube section for longitudinal adjustment therein through a respective hole;
a plurality of prismatic support tubes mounted on an upperside of said base plate, each said support tube being disposed over one of said holes in alignment with a respective tube section and having an inwardly directed base flange; and
means passing through a respective hole for clamping each said base flange to said base plate.

10. The combination as set forth in claim 9 wherein each hole has at least two longitudinal grooves therein, and wherein said means includes a sleeve having bayonet lugs on one end for passing through said grooves of a respective hole to abut said underside of said base plate and a screw-thread at an opposite end, and a screw-threaded member threaded onto said screw-thread of said sleeve in abutting relation with said base flange.

11. The combination as set forth in claim 10 wherein said screw-thread on said sleeve is an external screw-thread and said screw-threaded member is a nut.

12. The combination as set forth in claim 10 wherein said longitudinal grooves and said lugs are uniformly distributed about the periphery of said hole and said sleeve respectively, at a given pitch and wherein said sleeve has a plurality of tool-engagement surfaces disposed at said given pitch for rotation of said sleeve.

13. The combination as set forth in claim 10 wherein said screw-threaded member has tool-engagement surfaces for rotation of said screw-threaded member and an outer periphery for centering a bundle of nuclear fuel elements.

14. A rack for storing bundles of nuclear fuel elements in a water tank, said rack comprising
a horizontally disposed base plate having a predetermined pattern of holes therein;
a plurality of tube sections on an underside of said base plate, each said tube section being disposed coaxially with a respective hole and having a first screw-thread at an end remote from said base plate; and
a plurality of vertically adjustable feet, each said foot being threaded into a screw-thread of a respective tube section for longitudinal adjustment threrein through a respective hole.

15. A rack as set forth in claim 14 wherein each tube section has a second screw-thread at an end adjacent said base plate and which further comprises a hollow bolt threaded into said second screw-thread and having a radial flange for clamping a flange of a prismatic support tube to said base plate.

16. A rack as set forth in claim 14 wherein each respective hole is threaded and which further comprises a hollow bolt threaded into said hole and having a radial flange for clamping a flange of a prismatic support tube to said base plate.

17. A rack as set forth in claim 14 which further comprises a base loosely connected to a respective foot, said base and said respective foot having mating spherical surfaces thereon, and a hollow screw threaded into said first screw-thread in abutment with a top end face of a respective foot.

18. A rack as set forth in claim 14 further comprising a hollowed means passing through a respective hole for clamping a base flange of a support tube to an upperside of said base plate.

19. A rack as set forth in claim 18 wherein said means is threaded into a respective tube section.

20. A rack as set forth in claim 18 wherein said means is threaded into said base plate.

21. A rack as set forth in claim 18 wherein said means is clamped to said base plate.

* * * * *